US009886088B2

(12) United States Patent
Dietz et al.

(10) Patent No.: US 9,886,088 B2
(45) Date of Patent: Feb. 6, 2018

(54) PHYSICALLY MODULATING FRICTION IN A STYLUS

(75) Inventors: Paul Henry Dietz, Redmon, WA (US); Kenneth Paul Hinckley, Redmond, WA (US); Anoop Gupta, Woodinville, WA (US); Tristan Thomas Trutna, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 414 days.

(21) Appl. No.: 13/569,818

(22) Filed: Aug. 8, 2012

(65) Prior Publication Data

US 2014/0043242 A1 Feb. 13, 2014

(51) Int. Cl.
  *G06F 3/041* (2006.01)
  *G06F 3/033* (2013.01)
  *G06F 3/01* (2006.01)
  *G06F 3/0354* (2013.01)

(52) U.S. Cl.
  CPC .......... *G06F 3/016* (2013.01); *G06F 3/03545* (2013.01)

(58) Field of Classification Search
  USPC .................. 345/178, 180–184, 173, 179
  See application file for complete search history.

(56) References Cited

U.S. PATENT DOCUMENTS 5,327,348 A * 7/1994 Kato .............................. 701/530
5,627,348 A * 5/1997 Berkson .............. G06F 3/03545
                                                       178/19.02
6,483,499 B1 * 11/2002 Li et al. ......................... 345/179
6,647,145 B1 * 11/2003 Gay ............................... 382/187
6,771,254 B2 * 8/2004 An ...................... G06F 3/03545
                                                       15/445
7,265,750 B2 * 9/2007 Rosenberg ..................... 345/182

(Continued)

OTHER PUBLICATIONS

Poupyrev, et al., "Haptic Feedback for Pen Computing: Directions and Strategies", Retrieved at <<http://ivanpoupyrev.com/e-library/2004/CHI2004_pentactile.pdf>>, Proceeding on Human factors in computing systems, Apr. 24, 2004, p. 1309-1312.

(Continued)

*Primary Examiner* — Jennifer Mehmood
*Assistant Examiner* — Deeprose Subedi
(74) *Attorney, Agent, or Firm* — Lyon & Harr, LLP; Richard T. Lyon (57) ABSTRACT

A physically-modulated friction stylus system and method for physically modulating friction between a styli tip and a surface of a computing device to emulate the "feel" of different types of writing instruments writing on different types of surfaces (such as pen on paper or a paintbrush on canvas). The actual friction between the stylus and the surface is modulated to produce the "feel." The friction is physically modulated "on the fly" meaning that friction can be modulated while the stylus tip is in contact with the surface and while the stylus is moving. The friction is modulated dependent on a location of the stylus on the surface and the posture and orientation of the stylus. In addition, the friction can be modulated based on a direction and a velocity that the stylus tip is moving across the surface. Audio may also be used to improve the emulation experience.

8 Claims, 8 Drawing Sheets

(56) References Cited

U.S. PATENT DOCUMENTS

| | | | |
|---|---|---|---|
| 7,511,706 B2* | 3/2009 | Schena | 345/179 |
| 7,928,966 B2* | 4/2011 | Homer | 345/179 |
| 8,219,151 B2* | 7/2012 | Park et al. | 455/566 |
| 2005/0248549 A1* | 11/2005 | Dietz | G06F 3/016 345/179 |
| 2006/0158440 A1 | 7/2006 | Ashenbrenner | |
| 2009/0135149 A1* | 5/2009 | Taniuchi | G06F 3/04845 345/173 |
| 2009/0135164 A1 | 5/2009 | Kyung et al. | |
| 2010/0182284 A1* | 7/2010 | Tremblay | G06F 3/038 345/179 |
| 2011/0267182 A1 | 11/2011 | Westerinen et al. | |
| 2011/0267318 A1 | 11/2011 | Knee | |
| 2011/0273376 A1* | 11/2011 | Dickinson | G06F 3/03545 345/173 |
| 2012/0146957 A1 | 6/2012 | Dunagan | |
| 2012/0228039 A1* | 9/2012 | Hinson | G06F 3/03546 178/19.03 |
| 2012/0293415 A1* | 11/2012 | Adhikari | G06F 3/03545 345/167 |
| 2013/0038579 A1* | 2/2013 | Boyd et al. | 345/179 |
| 2013/0106721 A1* | 5/2013 | Pedersen | G06F 3/016 345/173 |
| 2013/0120324 A1* | 5/2013 | DiVerdi | G06F 3/0488 345/179 |

OTHER PUBLICATIONS

Kyung, et al., "wUbi-Pen: Windows Graphical User Interface Interacting with Haptic Feedback Stylus", Retrieved at <<http://www.mattosbond.com/ftp/backup/work/resources/other/(%20Disc%201%20)%20Papers%20And%20Classes/content/newtechdemos/1714-abstract.pdf>>, Proceedings: SIGGRAPH '08 ACM SIGGRAPH 2008 new tech demos, Aug. 11, 2008, p. 1-4.

"iFeel Mouse", Retrieved at <<http://www.gamevortex.com/gamevortex/hard_rev.php/91/ifeel-mouse-pc.html>>, Jan. 29, 2010, pp. 3.

"Amazon Kindle Fire Stylus Pens—Best Stylus for Drawing, Note-Taking and General Use", Retrieved at <<http://www.squidoo.com/kindle-fire-stylus>>, Retrieved Date: Mar. 16, 2012, pp. 9.

* cited by examiner

PHYSICALLY-MODULATED FRICTION STYLUS SYSTEM 100

PHYSICALLY MODULATING FRICTION IN A STYLUS

BACKGROUND

Styli are often used with computer tablets, embedded devices, and mobile computers to allow a user to provide input to the system. These styli often lack the range of mechanical friction behaviors seen with traditional writing instruments such as pens and pencils. This impacts the ability of users to achieve the types of writing and drawing effects they are used to creating with these traditional writing instruments. Moreover, unlike traditional writing instruments on various surfaces (such as paper), these styli have the same tactile feel no matter where on the surface they contact and no matter which what the styli are moving on the surface Users typically are used to a certain "feel" of their preferred writing instrument and know how to take advantage of that feel. Some users dislike writing on a very hard surface (such as a desktop), so they use blotters to make the pen on the paper feel right. What is really happening here is that the pen sinks into the blotter such that the friction that the user feels goes up as compared to writing on a hard surface. Users definitely have preferences about the amount of friction that they desire when they are writing on a surface.

In addition, many styli lack the tactile feedback of traditional writing instruments on a writing surface that give these instruments their familiar feel. For example, writing with a stylus on a glass surface feels nothing like writing with a pencil on paper. With pen on paper the "feel" is different when the stroke is going in one direction than it is when going in another direction. But pen on glass tends to feel the same in all directions of the stroke. This is because unlike the pencil on paper the friction of the styli on the glass surface is the same no matter what the orientation of the stylus relative to the glass surface.

In addition not having the frictional behavior of traditional writing instruments, computer styli often do not "sound right." Many studies suggest that sounds play an important part in convincingly making the human brain believe what is being felt and seen. Although some techniques have added sounds to the computer styli these technique are often unconvincing.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the physically-modulated friction stylus system and method physically modulate the friction between the styli tip and the surface of the computing device in order to emulate different types writing instruments. Moreover, embodiments of the system and method can physically modulate the friction to emulate the feel of these various types of writing instruments writing on different types of surfaces (such as pen on paper or a paintbrush on canvas). Thus, the actual friction between the stylus and the surface is modulated to produce the "feel" of a desired writing instrument on a desired writing surface.

The friction is physically modulated "on the fly" meaning that friction changes can be made during the execution of an activity. Typically this means that the friction can be modulate while the stylus tip is in contact with the surface and while the stylus is moving. This also means that the friction can be physically modulated without taking the stylus tip off the surface. Moreover, the friction is modulated dependent on a location of the stylus on the surface and the posture and orientation of the stylus. In addition, the friction can be modulated based on a direction or velocity that the stylus tip is moving across the surface. Each of these actions provides the user with a sensory experience (or emulation experience) such that the stylus on the surface has the "feel" of the desired writing instrument on a desired writing surface (such as pencil writing on cardboard).

Embodiments of the physically-modulated friction stylus system and method use a physical modulation mechanism to achieve the friction modulation. The system and method contain several embodiments of the physical modulation mechanism. Any one of these embodiments can be used alone or in any combination with one another.

A first embodiment physically vibrates the tip of the stylus. One way in which this can be done is to use an actuator to vibrate the stylus tip (such as a piezoelectric actuator). Another way in which this can be done is to etch the surface (such as with grooves or pits) and move the stylus tip over the etched surface to vibrate the stylus tip.

A second embodiment uses a clutching mechanism to clutch a ball making up the stylus tip. The ball is in contact with the surface and the friction is modulated by clutching the ball with the clutching mechanism. The clutching mechanism may be external to the stylus, such as a magnetic force emanating from the surface. Alternatively, the clutching mechanism may be internal to the stylus. This internal clutching mechanism may make physical contact with the ball or the ball may be clutched without making any physical contact between the ball and the clutching mechanism.

A third embodiment of the physical modulation mechanism uses various materials at the stylus tip to physically modulate the friction between the stylus tip and the surface. This can be achieved by moving a first material out through the stylus tip relative to a second material. In this manner the first material contacts the surface while the second material withdraws from the surface. In some embodiments the first material is moved out through holes in the second material.

Embodiments of the physically-modulated friction stylus system and method also include varying parameters dynamically in accordance with underlying graphics displayed on the surface of the computing device or with an application running on the computing device. For example, friction and "stickiness" may be varied by stylus location so as to help users find on-screen controls. Friction is a lateral adhesion between two bodies. Friction forces act parallel to a surface in the opposite direction of motion. Stickiness is a combination of several physical manifestations of adhesion. Most adhesion forces act normal to the surface as the contact patch between the stylus and the surface is reduced or changed in shape. In addition, a program that teaches kids to make write by making letters may use physically modulated friction to attempt to guide a child towards correct strokes.

Embodiments of the physically-modulated friction stylus system and method also include several audio and visual emulation enhancements. Audio effects include providing audio of the stylus tip moving across the surface such that the audio appears to be coming from the stylus tip and emulates the sound of a desired writing instrument. The audio playback system can be on the stylus, external the stylus, or both. The audio may be varied based on a direction that the stylus is moving on the surface.

Visual effects may be created on the surface such that it appears as if the stylus is writing on desired writing surface. In particular, the visual effects correspond to the desired writing instrument writing on the desired writing surface to give this illusion when the stylus is writing on the surface. This further enhances the emulation and sensory experience of the user.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout.

DETAILED DESCRIPTION

In the following description of embodiments of a physically-modulated friction stylus system and method reference is made to the accompanying drawings, which form a part thereof, and in which is shown by way of illustration a specific example whereby embodiments of the physically-modulated friction stylus system and method may be practiced. It is to be understood that other embodiments may be utilized and structural changes may be made without departing from the scope of the claimed subject matter.

I. System Overview

Embodiments of the physically-modulated friction stylus system and method provide a way for a user to change the friction of the tip of a stylus on the fly and while the stylus tip is in contact with the surface of a computing device. This allows embodiments of the physically-modulated friction stylus system and method to emulate different styli on the fly. Embodiments of the physically-modulated friction stylus system and method are also able to emulate the "feel" of various combinations of different writing instruments being used on different types of surfaces, such as a pen on paper or paintbrush on wood.

Other embodiments of the system and method use motion-sensing stylus gestures that function even when the pen is away from the screen. Haptic, tactile, or vibrotactile enhancement of the stylus (or parts thereof) and possibly of a tablet itself (presuming it is still being held in the opposite hand) can be employed away from the surface to offer feedback on gestures or other notifications and refinements for interaction. Furthermore, even without these, a stylus may be used while in hover range (in other words, when the stylus is not touching the surface but still within the cursor tracking distance) and gestures or movements made in this region may benefit from tactile enhancements as well.

Figure 1:
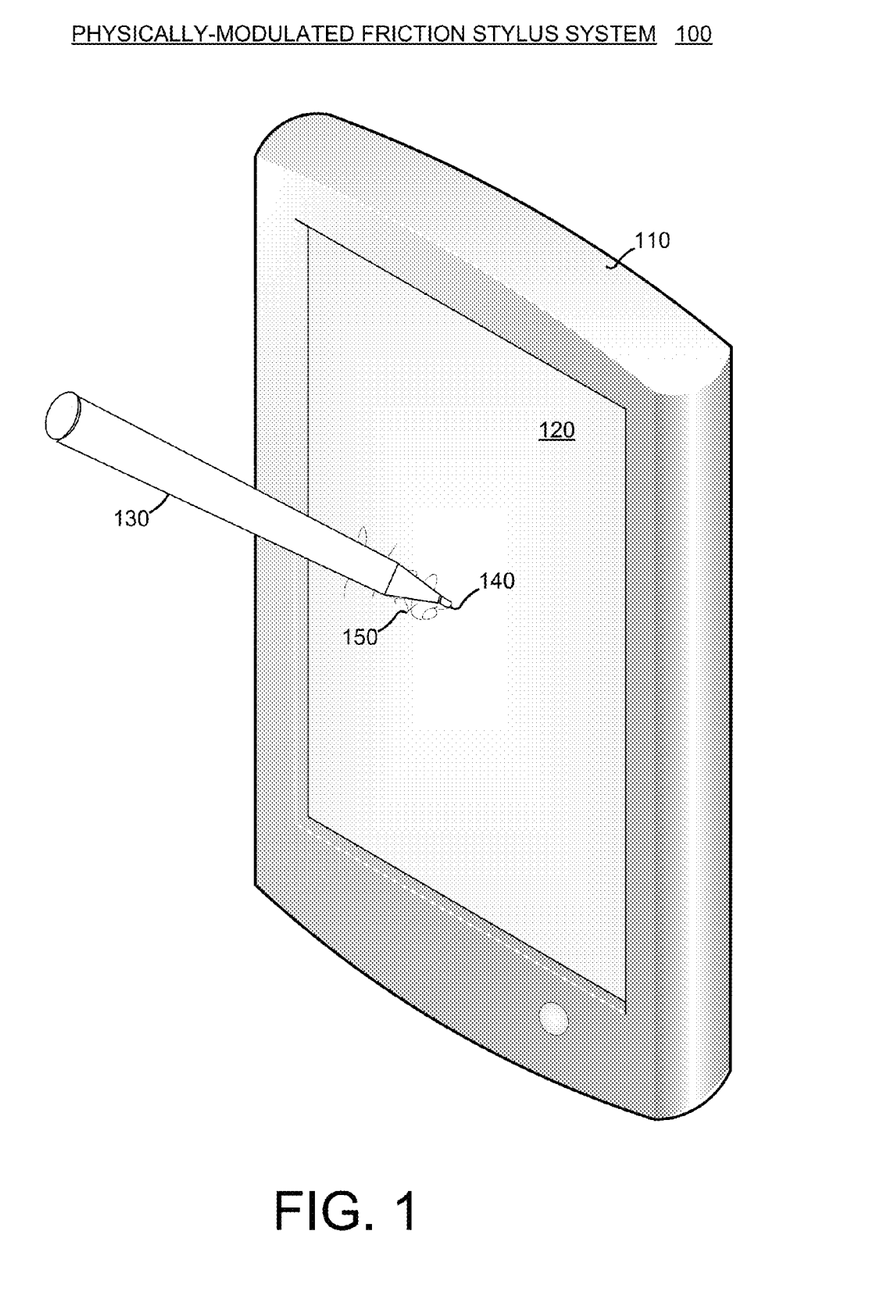
FIG. 1 is a block diagram illustrating a general overview of embodiments of the physically-modulated friction stylus system and method implemented in a computing environment.

FIG. 1 is a block diagram illustrating a general overview of embodiments of the physically-modulated friction stylus system and method implemented in a computing environment. In particular, embodiments of the physically-modulated friction stylus system 100 include a computing device 110 having a surface 120, such as a touchscreen surface. Embodiments of the physically-modulated friction stylus system 100 also include a stylus 130 having a stylus tip 140.

The stylus 130 is used to input information (such as data and commands) into the computing device 110. This input of data occurs by having a user (not shown) hold the stylus 130 and by placing the stylus tip 140 in contact with the surface 120 and performing any of a variety of movements. These movements include pressing on the surface 120 and writing on the surface 120. For example, in FIG. 1 the input text 150 is shown on the surface 120 that has been made by the user by writing with the stylus 130 on the surface 120. With this and various other movements the user can interact with the computing device 110 by the stylus 130 and the surface 120.

II. Exemplary Operating Environment

Before proceeding further with the operational overview and details of embodiments of the physically-modulated friction stylus system 100 and method, a discussion will now be presented of an exemplary operating environment in which embodiments of the physically-modulated friction stylus system 100 and method may operate. Embodiments of the physically-modulated friction stylus system 100 and method described herein are operational within numerous types of general purpose or special purpose computing system environments or configurations.

Figure 2:
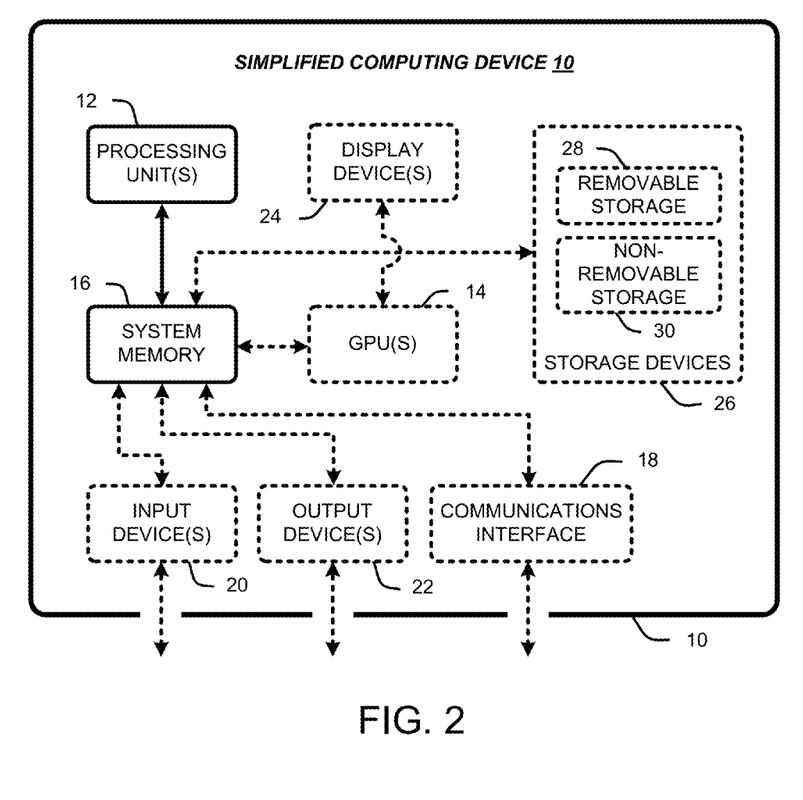
FIG. 2 illustrates a simplified example of a general-purpose computer system on which various embodiments and elements of the physically-modulated friction stylus system and method, as described herein and shown in FIGS. 1 and 3-8, may be implemented.

FIG. 2 illustrates a simplified example of a general-purpose computer system on which various embodiments and elements of the physically-modulated friction stylus system 100 and method, as described herein and shown in FIGS. 1 and 3-8, may be implemented. It should be noted that any boxes that are represented by broken or dashed lines in FIG. 2 represent alternate embodiments of the simplified computing device, and that any or all of these alternate embodiments, as described below, may be used in combination with other alternate embodiments that are described throughout this document.

For example, FIG. 2 shows a general system diagram showing a simplified computing device 10. The simplified computing device 10 may be a simplified version of the computing device 110 shown in FIG. 1. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement embodiments of the physically-modulated friction stylus system 100 and method described herein, the device should have a sufficient computational capability and system memory to enable basic computational operations. In particular, as illustrated by FIG. 2, the computational capability is generally illustrated by one or more processing unit(s) 12, and may also include one or more GPUs 14, either or both in communication with system memory 16. Note that that the processing unit(s) 12 of the general computing device of may be specialized microprocessors, such as a DSP, a VLIW, or other microcontroller, or can be conventional CPUs having one or more processing cores, including specialized GPU-based cores in a multi-core CPU.

In addition, the simplified computing device 10 of FIG. 2 may also include other components, such as, for example, a communications interface 18. The simplified computing device 10 of FIG. 2 may also include one or more conventional computer input devices 20 (e.g., styli (such as the stylus 130 shown in FIG. 1), pointing devices, keyboards, audio input devices, video input devices, haptic input devices, devices for receiving wired or wireless data transmissions, etc.). The simplified computing device 10 of FIG. 2 may also include other optional components, such as, for example, one or more conventional computer output devices 22 (e.g., display device(s) 24, audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device 10 of FIG. 2 may also include a variety of computer readable media. Computer readable media can be any available media that can be accessed by the simplified computing device 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the physically-modulated friction stylus system 100 and method described herein, or portions thereof, may be stored, received, transmitted, or read from any desired combination of computer or machine readable media or storage devices and communication media in the form of computer executable instructions or other data structures.

Finally, embodiments of the physically-modulated friction stylus system 100 and method described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

III. Operational Overview

Figure 3:
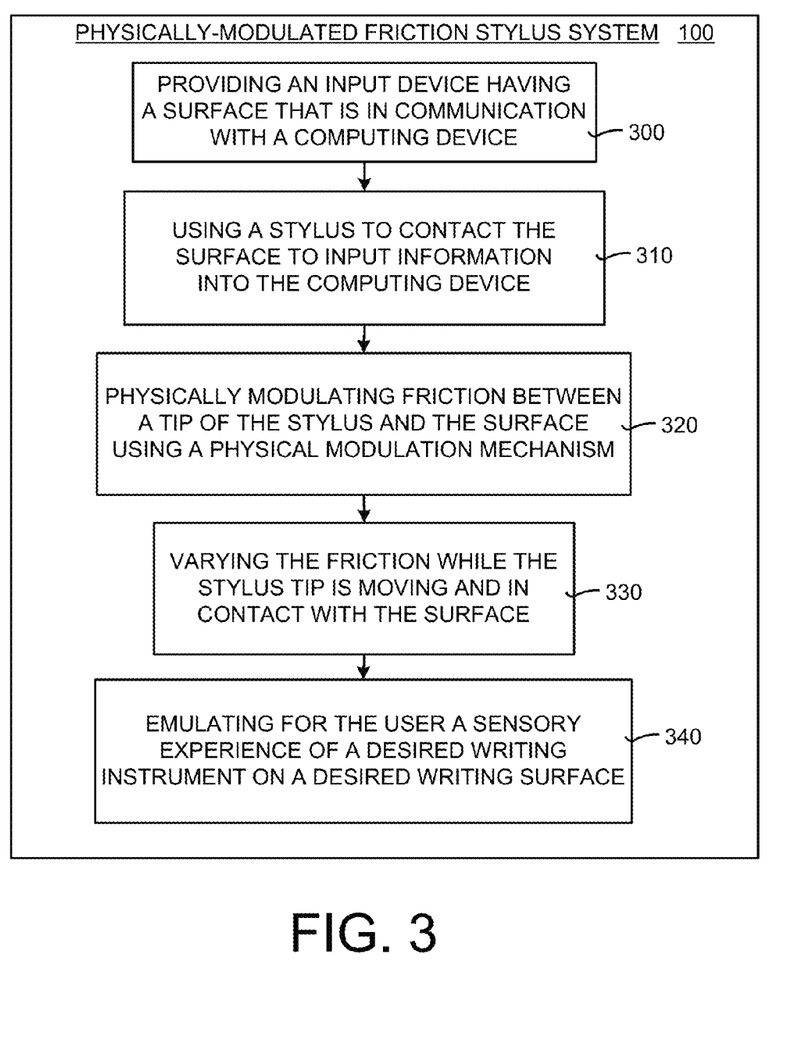
FIG. 3 is a flow diagram illustrating the general operation of embodiments of the physically-modulated friction stylus system and method shown in FIG. 1.

FIG. 3 is a flow diagram illustrating the general operation of embodiments of the physically-modulated friction stylus system 100 and method shown in FIG. 1. As shown in FIG. 3, the operation of embodiments of the physically-modulated friction stylus method begins providing an input device having the surface 120 that is in communication with the computing device 110 (box 300). The stylus 130 is used by the user to contact the surface 120 in order to input the information into the computing device 110 (box 310).

The method includes physically modulating the friction between the stylus tip 140 and the surface 120 (box 320). The amount of friction is physically modulated and varied using a physical modulation mechanism that is discussed in detail below. Moreover, the friction can be varied "on the fly," which means that friction changes can be made during the execution of the activity. In other words, the friction between the stylus tip 140 and the surface 120 can be made while the stylus tip 140 is moving on the surface 120 and in contact with the surface 120. Embodiments of the physically-modulated friction stylus system 100 and method include varying the friction while the stylus tip 140 is moving and in contact with the surface 120 (box 330). Note that in other embodiments of the system 100 and method a body or barrel of the stylus 130 can include vibrotactile or other tactile enhancements and the stylus 130 may or may not be in contact with the surface 120.

Embodiments of the physically-modulated friction stylus system 100 and method emulate for the user a sensory experience of a desired writing instruction on a desired writing surface (box 340). In other words, the physical modulation of the friction helps to emulate a particular user experience for the user. For example, if a user wants to emulate a pen on paper "feel" embodiments of the physically-modulated friction stylus system 100 and method can physically modulate the friction between the stylus tip 140 and the surface 120 to create that effect. In other embodiments, one example of how embodiments of the system 100 and method can provide some kind of tactile feedback while the stylus 130 is not in contact with the surface 120 is that of an airbrush. While the paint is flowing it produces a certain vibration and sound, which might even vary depending on the type or mix of paints being applied, yet the stylus 130 is not in contact with the surface 120.

IV. Operational Details

The operational details of embodiments of the physically-modulated friction stylus system 100 and method will now be discussed. This includes the operation of various embodiments of the physical modulation mechanism that modulates the friction between the stylus tip 140 and the surface 120. Moreover, the physical modulation mechanism allows the mechanical friction of the stylus 130 to be changed in a programmatic fashion. Thus, at one moment the stylus 130 can glide like a ball point pen across the surface 120 and at another moment it might feel scratchy like a pencil. This physical modulation of friction allows artists and other users to use well-developed and familiar physical techniques to achieve the effects they desire.

Embodiments of the physically-modulated friction stylus system 100 and method uses several different methods to physically modulate the friction between the stylus tip 140 and the surface 120. These include vibration, clutching of a roller, and mechanical modification of the stylus tip 140. One, two, or any combination of these mechanisms may be used physically modulate the friction. Each of these embodiments will now be discussed in detail.

IV.A. First Embodiment of the Physical Modulation Mechanism

A first embodiment of the physically-modulated friction stylus system 100 and method uses vibration as the physical modulation mechanism. In this embodiment the mechanical vibrations are used to break static friction. This allows the stylus tip 140 to "hop" over texture on the surface 120.

Figure 4:
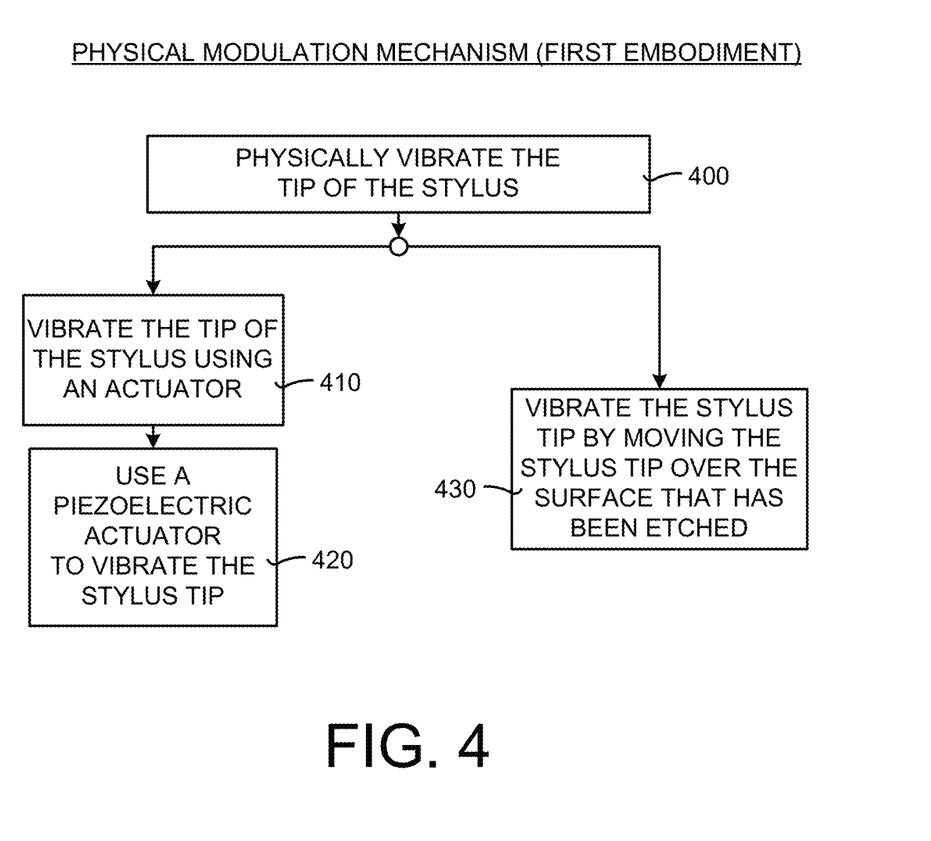
FIG. 4 is a flow diagram illustrating the operational details of the first embodiment of the physical modulation mechanism shown in FIG. 3.

FIG. 4 is a flow diagram illustrating the operational details of the first embodiment of the physical modulation mechanism shown in FIG. 3. The operation begins by physically vibrating the stylus tip 140 (box 400). In some embodiments, this is achieved by vibrating the stylus tip 140 using an actuator (box 410).

In some embodiments the actuator is a piezoelectric actuator that is used to vibrate the stylus tip 140 (box 420). This is achieved by placing a small piezo-transducer or other appropriate mechanism in the stylus tip 140 and vibrating the tip 140. Typically the material selected for the actuator is a material that has a large difference between static and kinetic friction. In other words, this material that has a high coefficient of static friction and a low coefficient of dynamic friction. This allows the vibration effect to be more pronounced. In other embodiments the actuator can be electrostatic, electromagnetic, or can be an ultrasonic transducer.

In still other embodiments the physical vibration of the stylus tip 140 is achieved by moving the stylus tip 140 over etchings in the surface 120 (box 430). In other words, the surface 120 has been microscopically etched such that the action of moving the stylus tip 140 over the surface 120 causes the stylus tip 140 to vibrate and modulate friction in a desired manner. In some embodiments this surface etching may be grooves while in other embodiments the surface etching may be pits or holes.

IV.B. Second Embodiment of the Physical Modulation Mechanism

A second embodiment of the physically-modulated friction stylus system 100 and method uses the clutching of a roller in the stylus tip 140 as the physical modulation mechanism. "Clutching" the ball involves any type of manipulation that changes the friction between the ball and the surface 120.

Figure 5:
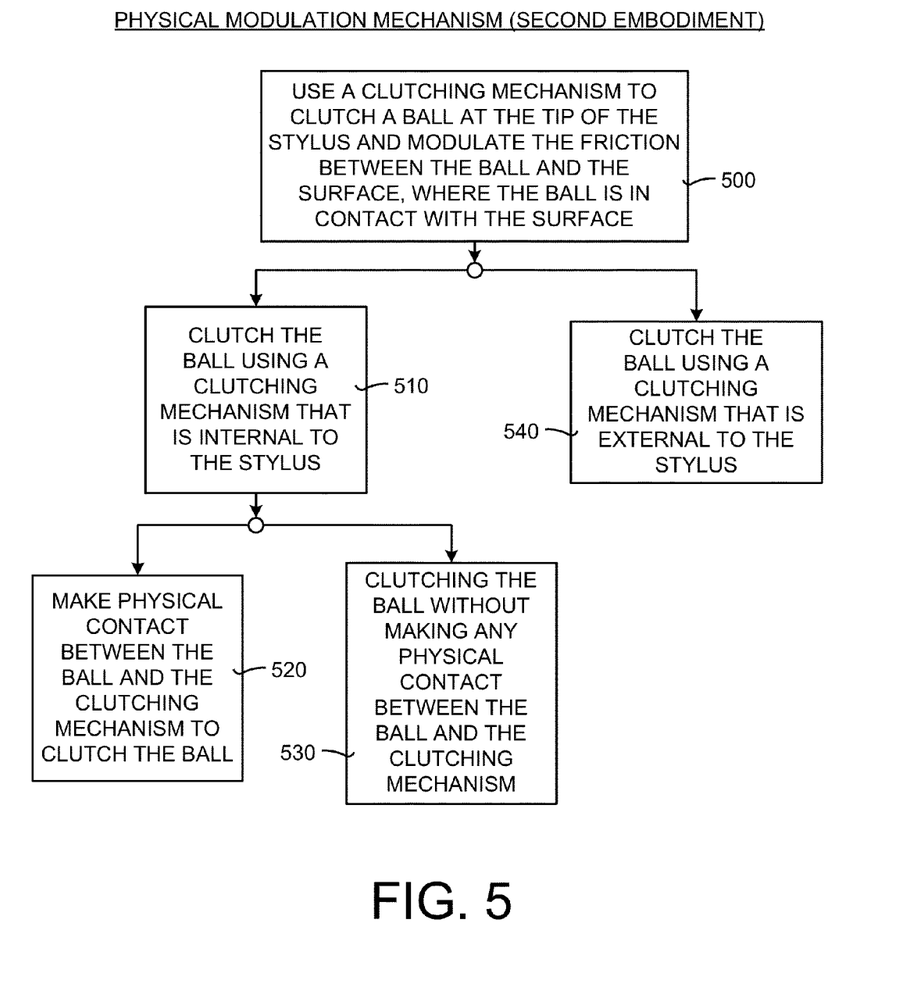
FIG. 5 is a flow diagram illustrating the operational details of the second embodiment of the physical modulation mechanism shown in FIG. 3.

FIG. 5 is a flow diagram illustrating the operational details of the second embodiment of the physical modulation mechanism shown in FIG. 3. The operation begins by using a clutching mechanism to clutch a ball at the stylus tip 140 and modulating the friction between the ball and the surface 120 (box 500). This is done while the ball is in contact with the surface 120.

This clutching mechanism is similar to a ball in a ballpoint pen. The ball makes up the stylus tip 140 and is allowed to roll along the surface 120. The rolling friction of the ball inside the stylus tip 140 can be modulated by a clutch mechanism. There are many different ways to control the friction to the ball.

In some embodiments the clutching mechanisms is internal to the stylus 130 (box 510). Some embodiments of the internal clutching mechanism clutch the ball by making physical contact between the ball and the clutching mechanism (box 520). In other words the ball is clamped periodically to change and regulate the friction on the ball. Some of these embodiments using a piezo clutch or a fluidic clutch to periodically clamp the ball.

Other embodiments clutch the ball without making any type of physical contact between the ball and the clutching mechanism (box 530). This type of internal clutching mechanism can use such clutching forces as magnetic force. Moreover, in other embodiments the ball can be clutched using a clutching mechanism that is external to the stylus (box 540). By way of example, the ball in the stylus could be magnetic and a magnetic force emanating from the computing device 110 or the surface 120 could be used as the clutching mechanism.

IV.C. Third Embodiment of the Physical Modulation Mechanism

A third embodiment of the physically-modulated friction stylus system 100 and method uses the mechanical modification of the stylus tip 140 as the physical modulation mechanism. This tip modification can include a first material that glides easily across the surface 120 and has one or more holes. A second material having a higher friction that the first material can be pushed out through the hole to mechanically change the friction of the stylus tip 140.

Figure 6:
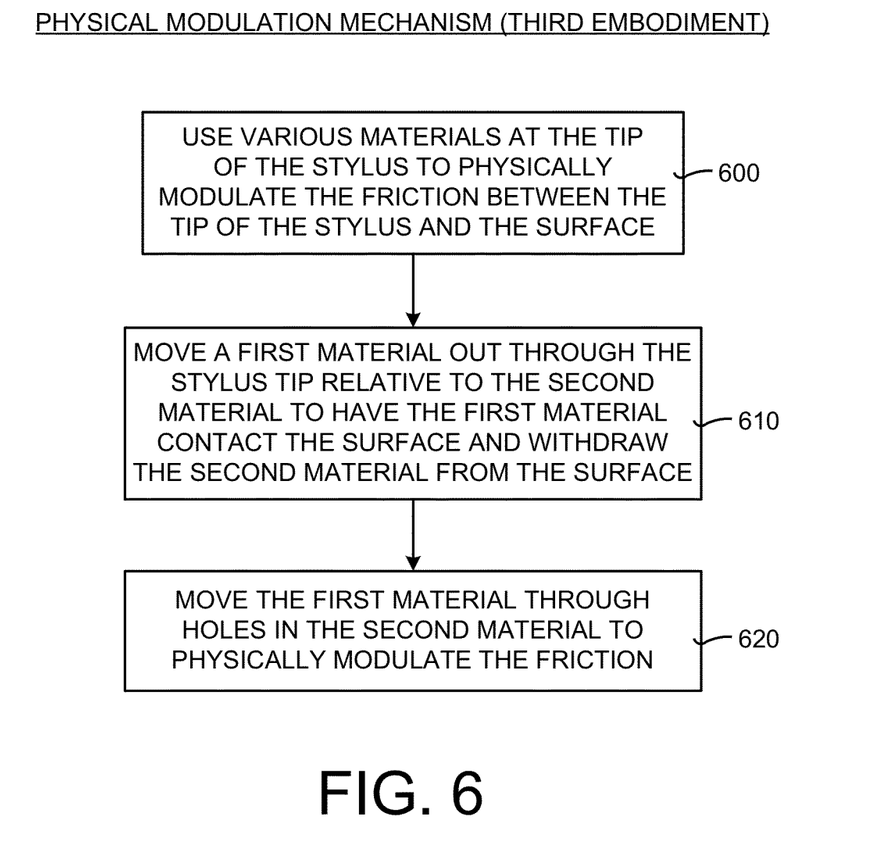
FIG. 6 is a flow diagram illustrating the operational details of the third embodiment of the physical modulation mechanism shown in FIG. 3.

FIG. 6 is a flow diagram illustrating the operational details of the third embodiment of the physical modulation mechanism shown in FIG. 3. Various materials are used at the stylus tip 140 to physically modulate the friction between the stylus tip 140 and the surface 120 (box 600). In some embodiments, a first material is moved out through the stylus tip 140 relative to the second material so that the first material contact the surface 120 and the second material withdraws from the surface 120 (box 610). The first material and the second material have different coefficients of friction. The first material is moved out through holes in the second material in order to physically modulate the friction (box 620).

For example, imagine a sheet of ceramic having a series of hole in it. Running your fingers along the ceramic provides a certain feel and a fairly low amount of resistance or friction. However, if grass is pushed up through the holes and then your fingers are run over the ceramic in the same spot then this provides very different feel from the ceramic itself. Some material (the grass) is being moved out relative to some other different material (the ceramic) in order to change amount of friction and the feel of the surface.

In other embodiments the first material is a shell or casing the encircles the second material. The second material is able to move relative to the first material. If the second material is retracted then the amount of friction produced is the friction of the first material over the surface 120. However, if the second material is brought out and into contact with the surface 120 then the friction changes. The more the second material is brought out the more the friction changes. Eventually the second material will only be in contact with the surface 120 and the first material with have no effect on the friction between the stylus tip 140 and the surface 120. Typically this movement between the first material and the second material is in microns.

In still other embodiments a variety of different types of materials having various coefficients of friction could be contained within the stylus tip 140. Depending on the type of effect desired, any one or any combination of materials could be in contact with the surface 120 to modulate the friction between the stylus tip 140 and the surface 120. In some respects this is like a multi-color pencils or pens having various colors of tips.

IV.D. Modulating Friction Based on Position of Stylus

Visual feedback tends to dominate tactile feedback. Embodiments of the physically-modulated friction stylus system 100 and method can modulate the friction between the stylus tie 140 and the surface 120 based on the location of the stylus on the surface 120. This friction modulation can be based on several things.

Figure 7:
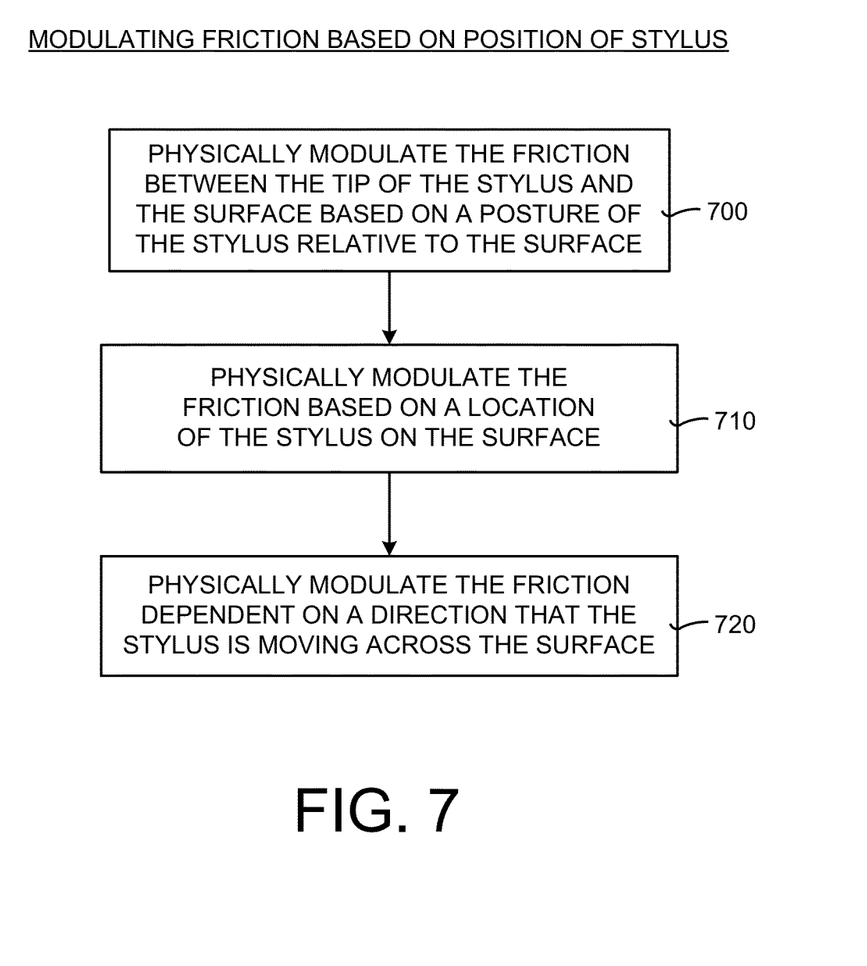
FIG. 7 is a flow diagram illustrating the operational details of modulating friction based on a position of the stylus shown in FIG. 1.

FIG. 7 is a flow diagram illustrating the operational details of modulating friction based on a position of the stylus shown in FIG. 1. Embodiments of the system 100 physically modulate the friction between the stylus tip 140 and the surface 120 based on a posture of the stylus 130 relative to the surface 120 (box 700). In some embodiments the system 100 senses tilt angle of the stylus 130 relative to the surface 120. Note that the term "tilt" includes the 3D orientation of the stylus 130. In other words, the azimuth, elevation, and roll angles of the stylus 130 relative to the writing surface 120. In response to these angles friction may be modulated so as to simulate the effect of various-shaped stylus tips or nibs, such as a chisel tip, a fan brush, a conte crayon, a ball point, and the like. Based on the tilt angle the friction is modulated such that the feel of the stylus 130 is different when the tilt angle is straight up and down (relative to the surface 120) as compared to when the tilt angle is at an angle from straight up and down. In some embodiments the tilt angle is known as a relative angle.

Moreover, some embodiments of the system 100 physically modulate the friction based on a location of the stylus 130 on the surface 120 (box 710). This location on the surface 120 typically is correlated to an application or program running on the computing device 110. The location of the stylus 130 on the surface 120 dictates the friction between the stylus 130 and the surface 120. In some embodiments frictional or vibrotactile feedback that produce the effects of a certain tooth of paper, of various-shaped nibs, and so forth may be modulated with additive (or subtractive) frictions suggested by the presence of on-screen controls, alignment lines, tool palettes, and the like.

These embodiments involve varying parameters dynamically in accordance with the underlying graphics displayed on the surface 120 the application graphics. By way of example, the stylus 130 may feel different if it is inside a scroll bar as when it is at another location on the surface 120. This means that is the user moves a scroll bar up and down there may be a low-friction feel on the stylus 130 while moving the stylus 130 to the left and right provides a much higher friction. This makes the stylus 130 feels as if it is in a groove when the user performs a scrolling operation.

Moreover, friction may be varied by the location of the stylus 130 so as to help users find on-screen controls. Some embodiments include a program that teaches children how to write. For example, the program and embodiments of the system 100 and method may help a user make letters on the surface 120 by guiding the user towards appropriate strokes. In other words the stylus 130 is biased toward correct writing strokes.

Other embodiments physically modulate the friction dependent on a direction or velocity that the stylus 130 is moving across the surface 120 (box 720). This gives the user the feeling that the surface 120 has a texture. This is because texture generally has a direction associated with it. It should be noted that any one of these embodiments or any combination of these embodiments can be used to dictate how the friction is physically modulated.

IV.E. Audio and Visual Emulation Enhancements

Research shows that audio greatly impacts and can help improve a user's perception of an emulation experience. Audio can even effectively fool a user into thinking that she feels things that are not actually happening. Thus, audio can be effective by itself or in addition to the physical modulation of the friction.

Figure 8:
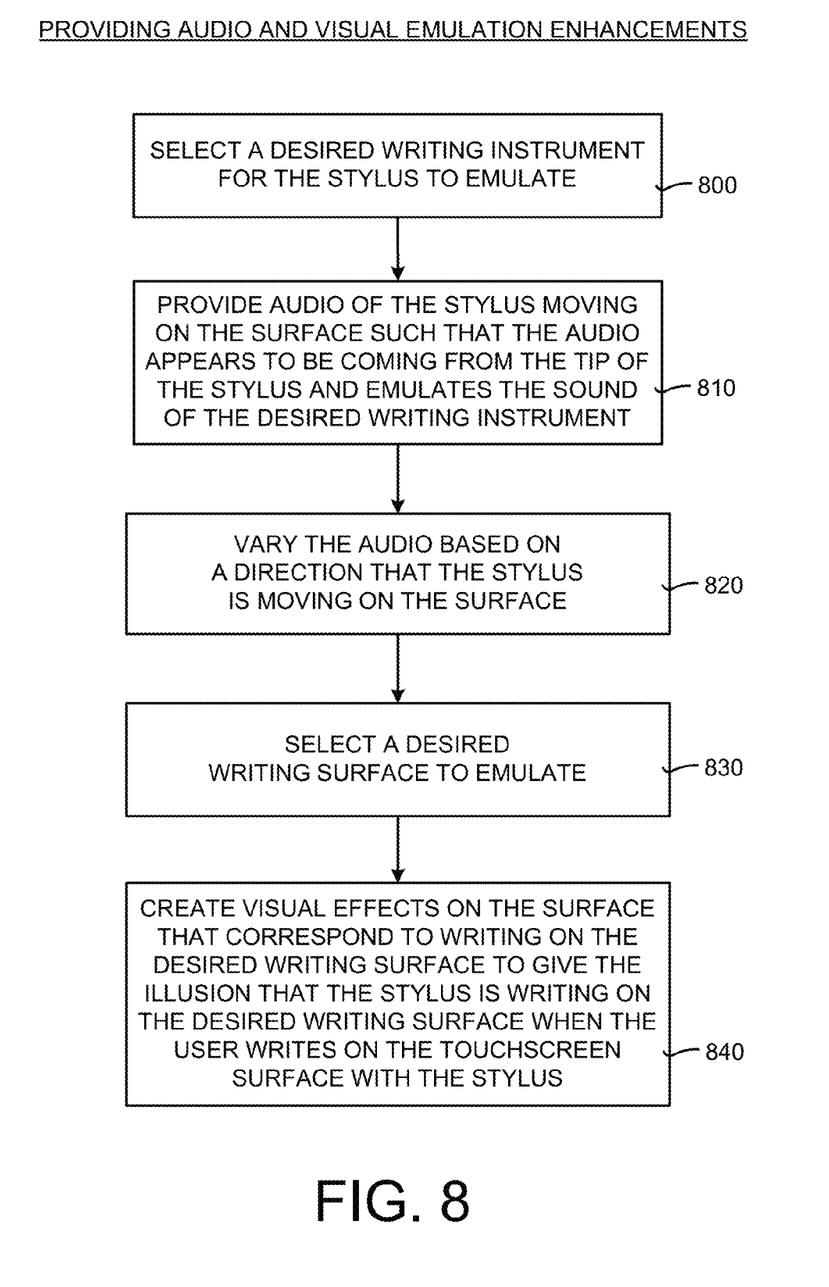
FIG. 8 is a flow diagram illustrating the operational details of providing audio and visual emulation enhancements to the physically-modulated friction stylus system shown in FIG. 1.

Embodiments of the system 100 and method can enhance the realism of the emulation experience by including appropriate audio feedback. FIG. 8 is a flow diagram illustrating the operational details of providing audio and visual emulation enhancements to the physically-modulated friction stylus system 100 shown in FIG. 1. The operation begins by selecting a desired writing instrument for the stylus 130 to emulate (box 800). For example, when emulating a pencil, the stylus 130 will emit sounds similar to an actual pencil. In some embodiments these sounds will vary with speed and pressure of the stylus 130 just like a real pencil interaction. On the other hand a brush might change behavior as the supply of paint diminishes during a long stroke.

Next, embodiments of the system 100 and method provide audio of the stylus 130 moving on the surface 120 such that the audio appears to be coming from the stylus tip 140 and emulates the sound of the desired writing instrument (box 810). The audio Illusion is more effective if the sound appears to be coming from a point of contact between the stylus tip 140 and the surface 120.

In some embodiments there is an audio playback system internal to the stylus 120. The audio playback system can be driven based on factors such as speed, friction, or mode. In other embodiments the audio playback system is external to the stylus 130 but the sound is simulated or "thrown" such that it appears that the sound is coming from the point of contact. In some embodiments panning of an external audio playback system is used for this audio simulation. In some embodiments prerecorded sounds are used, while in other embodiments the sounds may be based on a current physical model.

Referring again to FIG. 8, some embodiments of the system 100 and method vary the audio based on a direction or velocity that the stylus 130 is moving (box 820). In other words the sound may be changed based on the posture of the stylus 130. This means that writing in one direction sounds different from writing in another direction.

Some embodiments of the system 100 and method also select a desired writing surface in which to emulate (box 830). In some embodiments this selection is made by the user. Once the desired writing surface is selected, embodiments of the system 100 and method create visual effects on the surface 120 that correspond to writing on the desired writing surface (box 840). This gives the illusion that the stylus is writing on the desired writing surface when the user writes on the surface 120 with the stylus 140. By was of example, the visual effect of a pen writing on paper will be different from a pen writing on cloth. Embodiments of the system 100 and method add to the visual illusion that helps to enrich the user's input and emulation experience.

Moreover, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for physically modulating friction between a surface of a touchscreen computing device and a stylus, comprising:
    contacting a tip of the stylus with the surface of the touchscreen computing device;
    moving the stylus across the surface; and
    physically modulating friction between the surface and the stylus by varying a material of the tip of the stylus as the stylus is moved across the surface, said varying comprising moving a first material, having a first coefficient of friction, out through the tip of the stylus relative to a second material, having a second coefficient of friction, using a first material extender, in order to have the first material contact the surface and cause the second material to withdraw from touching the surface, wherein the first coefficient of friction and the second coefficient of friction are different, said moving of the first material out through the tip of the stylus relative to the second material comprising moving the first material through holes in the second material.

2. A method for physically modulating friction between a surface of a touchscreen computing device and a stylus, comprising:
    contacting a tip of the stylus with the surface of the touchscreen computing device;
    moving the stylus across the surface; and
    physically modulating friction between the surface and the stylus by varying a material of the tip of the stylus as the stylus is moved across the surface, said varying comprising moving a first material, having a first coefficient of friction, out through the tip of the stylus relative to a second material, having a second coefficient of friction, using a first material extender, in order to have the first material contact the surface and cause the second material to withdraw from touching the surface, wherein the first coefficient of friction and the second coefficient of friction are different, said moving of the first material out through the tip of the stylus relative to the second material comprising using the first material extender to incrementally move the first material out through the tip of the stylus relative to the second material so that with each increment the first material contacts more of the surface that it did in the last-previous increment while the second material contacts less of the surface than it did in the last-previous increment until a final increment wherein only the first material contacts the surface.

3. A method for physically modulating friction between a tip of a stylus and a surface of an input device, comprising:
    using the tip of the stylus to contact the surface of the input device to input information into a computing device; and
    physically modulating friction between the tip of the stylus and the surface of the input device using a physical modulation mechanism disposed on or within the stylus tip, said physical modulation mechanism operating to affect the stylus tip so as to vary the friction while the stylus tip is moving on the surface dependent on a posture of the stylus in relation to the surface, wherein
    said friction variation comprises using a material extender as the physical modulation mechanism to move a first material, having a first coefficient of friction, out through the stylus tip relative to a second material, having a second coefficient of friction, in order to have the first material contact the surface,
    wherein the first coefficient of friction and the second coefficient of friction are different, and
    said moving of the first material out through the stylus tip relative to the second material comprises using the material extender to incrementally move the first material out through the stylus tip relative to the second material so that with each increment the first material contacts more of the surface than it did in the last-previous increment while the second material contacts less of the surface than it did in the last-previous increment until a final increment wherein only the first material contacts the surface.

4. The method of claim 3, wherein the material extender causes the second material to withdraw from touching the surface.

5. The method of claim 3, wherein incrementally moving the first material out through the stylus tip relative to the second material comprises moving the first material through holes in the second material.

6. The method of claim 3, further comprising varying the friction while the tip of the stylus is moving on the surface of the input device dependent on a direction that the stylus tip is moving on the surface.

7. The method of claim 3, further comprising:
    selecting a surface material that is a type of material that a user wants to create an illusion of writing on; and
    creating visual effects on the surface of the input device that corresponds to the selected surface material to give the illusion that the stylus is writing on the selected material when the user writes on the surface with the stylus.

8. A method for physically modulating friction between a stylus and a surface of an input device, comprising:
    using a tip of the stylus to contact the surface of the input device to input information into a computing device; and using a modulation mechanism disposed on or within said tip to physically modulate friction between said tip and said surface, wherein said modulation mechanism operates to affect said tip so as to vary said friction while said tip is moving on said surface dependent on a posture of the stylus in relation to said surface, said modulation mechanism comprises a material extender that operates to incrementally move a first material out through said tip relative to a second material so that with each increment the first material contacts more of said surface than it did in the last-previous increment while the second material contacts less of said surface than it did in the last-previous increment until a final increment wherein only the first material contacts said surface, and wherein the first material has a first coefficient of friction and the second material has a second coefficient of friction that is different than the first coefficient of friction.

* * * * *